(12) United States Patent
Paulsen et al.

(10) Patent No.: US 9,121,146 B2
(45) Date of Patent: Sep. 1, 2015

(54) DETERMINING MILLED VOLUME OR MILLED AREA OF A MILLED SURFACE

(71) Applicant: Wirtgen GmbH, Windhagen (DE)

(72) Inventors: Sven Paulsen, Brohl (DE); Stefan Wagner, Bad Honnef (DE); Klaus Vollmann, Waldbröl (DE); Lothar Schwalbach, Asbach (DE); Cyrus Barimani, Königswinter (DE); Günter Hähn, Königswinter (DE)

(73) Assignee: Wirtgen GmbH (DE)

( * ) Notice: Subject to any disclaimer, the term of this patent is extended or adjusted under 35 U.S.C. 154(b) by 21 days.

(21) Appl. No.: 13/647,103

(22) Filed: Oct. 8, 2012

(65) Prior Publication Data

US 2014/0097665 A1    Apr. 10, 2014

(51) Int. Cl.
  *G01B 11/24*    (2006.01)
  *E21C 35/00*    (2006.01)
  (Continued)

(52) U.S. Cl.
  CPC .............. *E01C 23/088* (2013.01); *G01B 11/00* (2013.01)

(58) Field of Classification Search
  CPC ... E01C 19/006; E01C 23/088; E01C 19/004; E01C 19/00; E01C 23/12; E02F 9/2025
  USPC .......... 299/1.05, 1.1, 1.2, 1.4, 1.5, 39.4, 36.1, 299/39.1; 404/84.05, 84.1, 93, 94; 701/50, 701/32.5, 33.4; 702/55, 155, 156, 158
  See application file for complete search history.

(56) References Cited

U.S. PATENT DOCUMENTS

| 4,943,119 A | * | 7/1990 | Zarniko et al. ................. 299/1.5 |
| 5,309,407 A | * | 5/1994 | Sehr et al. ....................... 367/96 |
| 6,371,566 B1 | * | 4/2002 | Haehn ............................ 299/1.5 |

(Continued)

FOREIGN PATENT DOCUMENTS

| DE | 9204614 U1 | 8/1992 |
| DE | 19756676 C1 | 6/1999 |

(Continued)

OTHER PUBLICATIONS

European Search Report in corresponding European Patent Application EP 13185180, dated Nov. 19, 2013, 4 pp. (not prior art).

(Continued)

*Primary Examiner* — John Kreck
*Assistant Examiner* — Carib Oquendo
(74) *Attorney, Agent, or Firm* — Lucian Wayne Beavers; Patterson Intellectual Property Law, PC

(57) ABSTRACT

A system is provided for determining a volume of material milled, or a surface area milled, by a construction machine having a milling drum. The volume of material milled is determined as a function of a cross-sectional area of material to be milled in front of the milling drum and a distance traveled by the construction machine while actively milling. The cross-sectional area is determined in part by direct machine observation of one or more profile characteristics of a ground surface in front of the milling drum. The surface area milled is determined as a function of the width of the area to be milled in front of the milling drum and a distance traveled by the construction machine while actively milling.

19 Claims, 13 Drawing Sheets

(51) Int. Cl.
*E01C 23/088* (2006.01)
*G01B 11/00* (2006.01)

(56) References Cited

U.S. PATENT DOCUMENTS

| | | | |
|---|---|---|---|
| 7,172,363 B2 * | 2/2007 | Olson et al. | 404/75 |
| 7,510,347 B2 * | 3/2009 | Lemke | 404/84.5 |
| 7,689,351 B2 | 3/2010 | McCain | |
| 8,047,741 B2 | 11/2011 | Von Schönebeck et al. | |
| 8,128,177 B2 | 3/2012 | Menzenbach et al. | |
| 8,246,270 B2 | 8/2012 | Berning et al. | |
| 8,292,371 B2 | 10/2012 | Menzenbach et al. | |
| 8,386,196 B2 | 2/2013 | Wagner et al. | |
| 8,424,972 B2 | 4/2013 | Berning et al. | |
| 8,456,290 B2 * | 6/2013 | Kido | 340/425.5 |
| 8,632,132 B2 | 1/2014 | Menzenbach et al. | |
| 8,672,581 B2 * | 3/2014 | Berning et al. | 404/84.05 |
| 8,807,867 B2 | 8/2014 | Berning et al. | |
| 2008/0153402 A1 | 6/2008 | Arcona et al. | |
| 2013/0197820 A1 | 8/2013 | Wagner et al. | |

FOREIGN PATENT DOCUMENTS

| | | |
|---|---|---|
| DE | 102007044090 A1 | 4/2009 |
| DE | 102008023743 A1 | 11/2009 |
| DE | 102008045470 A1 | 3/2010 |
| EP | 2119832 A1 | 11/2009 |
| JP | 01271504 A | 10/1989 |
| JP | 3172404 | 7/1991 |
| JP | 09125700 A | 5/1997 |
| JP | 1030919 A | 2/1998 |
| JP | 2000194983 A | 7/2000 |
| JP | 2000319815 A | 11/2000 |
| JP | 2002350116 A | 12/2002 |
| JP | 2008163734 A | 7/2008 |
| JP | 2009545689 A | 12/2009 |
| JP | 2011163111 A | 8/2011 |
| JP | 2011226265 A | 11/2011 |
| WO | 2012168186 A1 | 12/2012 |

OTHER PUBLICATIONS

Exhibit A: Leuze electronic website printout for LPS 36—Line profile sensor, 3 pp. (dated prior to Oct. 7, 2012).
Exhibit B: SICK LMS400 Brochure, 6 pp. (dated prior to Oct. 7, 2012).
Exhibit C: SMG Engineering LUXACT 1D Brochure website printout, 5 pp. (dated prior to Oct. 7, 2012).
Exhibit D: GMH Engineering HFW80 Fifth Wheel Sensor Brochure website printout, 2 pp. (dated prior to Oct. 7, 2012).
U.S. Appl. No. 14/124,078 which is the U.S. National Phase of International Application No. PCT/EP20121060505 (not prior art).
International Search Report corresponding to International Application No. PCT/EP2012/060505 in co-pending U.S. Appl. No. 14/124,078, 10 pp, dated Sep. 24, 2012. (not prior art).
Japanese Office Action Notification of Reason for Refusal, in corresponding Japanese Patent Application No. 2013-210470, dated Jan. 6, 2015, 7 pp. (not prior art).

* cited by examiner

DETERMINING MILLED VOLUME OR MILLED AREA OF A MILLED SURFACE

BACKGROUND OF THE INVENTION

1. Field of the Invention

The present invention relates generally to methods and apparatus for determining the volume of material milled or the area milled from a ground surface by a milling machine.

2. Description of the Prior Art

When working ground surfaces by means of milling machines, stabilizers or recyclers, and when mining deposits by means of mining machines (surface miners), the milled area and/or the milled volume is usually required as basis for the settlement of the services rendered for the purpose of documenting and settling the services rendered on the construction site. These data are determined or estimated, for example, from data previously known or determined from cartographic material or surveying documents, it being assumed here in a simplifying manner that the actually milled area or the actually milled volume precisely corresponds to the area to be milled or the volume to be milled that was previously stated in the contract.

It is also known to carry out, after completion of the milling operation, a more or less accurate determination of the milled area or the milled volume, respectively, by means of simple measuring instruments (for example, odometer and folding rule).

Lastly, it is also known to determine an approximated value of the currently milled volume and, by integration, establish a daily volume from the travelled distance, which can be read out from or is measured by a machine control system, and a milling depth, assuming that the milling drum width installed corresponds to the effectively milled milling width.

It has become apparent, however, that in practice the actually milled area or the actually milled volume deviates from the geometrical data stipulated in a service contract or from the data derived from surveying documents or maps with, as a general rule, the actually milled volume being the larger. This is therefore of disadvantage to the contracting company as the inaccurate settlement will be to its detriment. One reason for this may be, for example, the three-dimensionality of a course of, for example, a motorway section in a hilly area because the length of a milling trajectory is smaller in the map projection than in the three-dimensional course of the road. Another reason is additional work that was not known or not foreseeable prior to awarding the contract and is thus not reflected in the surveying documents or maps.

Measuring with simple measuring means (odometer, folding rule) is also merely a more or less accurate approximation to the actual service rendered as complex milling geometries are frequently also worked that are not accessible to calculation by way of simple means.

Such methods of settlement are not only inaccurate but also time-consuming.

More recently there has been proposed a system for automatically determining milled areas and/or milled volumes through the use of GPS or other technology to track the trajectory of the machine, and subsequent data-processing to add up milled areas or volumes and to subtract overlapping areas or volumes, as set forth in pending DE102011106139, also pending as PCT/EP2012/060505, the details of which are incorporated herein by reference.

There are, however, a number of difficulties encountered in the use of a GPS based system for tracking machine trajectories. One necessary condition for the use of GPS technology is a sufficiently large viewing angle in the sky. If the viewing angle is too small it will reduce the number of satellites that can be viewed and decrease the accuracy of the system. Also, so-called multi-path effects due for example to reflection of GPS signals off of tall buildings and trees can affect accuracy of the GPS system. As a result of such difficulties, a GPS based system may not be sufficiently accurate, especially in congested residential areas.

Accordingly, there is a continuing need for improved systems for the automatic determination of areas or volumes milled by such milling machines.

SUMMARY OF THE INVENTION

The present invention provides a system in which the cross-sectional area being milled and/or the actual milling width is determined by observation of a profile of the surface to be milled in front of the milling drum. Based on that cross-sectional area or on the milling width, and the distance traveled, a volume milled or an area milled can be calculated.

In one embodiment a system is provided for determining a volume of material milled by a construction machine having a milling drum, wherein the volume of material milled is determined as a function of a cross-sectional area of material to be milled in front of the milling drum and a distance traveled by the construction machine while actively milling. The cross-sectional area is determined in part by direct machine observation of one or more profile characteristics of a ground surface in front of the milling drum.

In another embodiment a method of determining a volume of material milled or a surface area milled by a construction machine having a milling drum, the drum having a drum width, comprises:

(a) detecting by machine observation a width parameter corresponding to a surface width, of a ground surface to be milled in front of the milling drum, the ground surface extending above a milling depth of the milling drum, the surface width being perpendicular to a direction of travel of the construction machine, the surface width being less than the milling drum width at least part of the time of step (a); and (b) determining the volume of material milled or the surface area milled at least partially as a function of the width parameter.

In another embodiment a method of determining an actual milling width of a strip of ground material being milled by a ground milling machine having a milling drum having a drum width, when the milling width is less than the drum width, comprises detecting a location relative to the milling drum of at least one previously cut edge of a previously milled area in front of the milling drum.

In another embodiment a method of determining a usage of a construction machine having a milling drum, the milling drum having a drum width, comprises:

(a) detecting with at least one profile sensor at least one profile parameter of a ground surface in front of the milling drum;

(b) detecting with at least one distance sensor at least one distance parameter corresponding to a distance traveled by the construction machine; and (c) determining the usage of the construction machine at least partially as a function of the profile parameter and the distance parameter.

In another embodiment the usage of the machine is measured by determining a volume of material milled, and prior to step (c), a step (d) is performed of determining with at least one depth sensor at least one depth parameter corresponding to a milling depth of the milling drum. In this embodiment, the step (c) comprises determining the volume of material milled at least partially as a function of the profile parameter, the depth parameter and the distance parameter. The steps (a) and (d) may be performed repeatedly at successive times, and the step (c) may further comprise determining a series of sub-volumes milled, each sub-volume being associated with at least one of the successive times, and summing of the sub-volumes.

In another embodiment the usage of the machine is measured by determining an area of a ground surface milled by the construction machine. In this embodiment there is an additional step of determining whether the milling drum is actively milling the ground surface, and step (c) comprises determining the area of the ground surface milled at least partially as a function of the profile parameter and the distance parameter for all time intervals during which the milling drum is actively milling the ground surface.

In another embodiment a construction machine includes a machine frame, a plurality of ground engaging supports for supporting the machine frame, a milling drum supported from the machine frame for milling a ground surface, the milling drum having a drum width, a profile sensor operable to detect at least one profile parameter of a ground surface in front of the milling drum, a distance sensor operable to detect at least one distance parameter corresponding to a distance traveled by the construction machine, and an on-board processor located on the construction machine and communicated with the sensors, the processor being configured to determine a usage of the construction machine at least partially as a function of the profile parameter, and the distance parameter.

In one embodiment the construction machine further includes at least one depth sensor configured to detect at least one depth parameter corresponding to a milling depth of the milling drum, and the on-board processor is configured to measure the usage of the machine as a volume of material milled at least partially as a function of the profile parameter, the depth parameter and the distance parameter.

In another embodiment a construction machine includes a machine frame, a plurality of ground engaging supports for supporting the machine frame, a milling drum supported from the machine frame for milling a ground surface, the milling drum having a drum width, and at least one sensor configured to detect a location relative to the drum width of at least one previously cut edge of a previously milled area in front of the milling drum.

In another embodiment a construction machine includes a machine frame, a plurality of ground engaging supports for supporting the machine frame, a milling drum supported from the machine frame for milling a ground surface, the milling drum having a drum width, and at least one sensor configured to detect a width parameter corresponding to a surface width of a ground surface to be milled in front of the milling drum when the surface width is less than the milling drum width.

Numerous objects, features and advantages of the present invention will be readily apparent to those skilled in the art upon a reading of the following disclosure when taken in conjunction with the accompanying drawings.

DETAILED DESCRIPTION OF THE INVENTION

Figure 1:
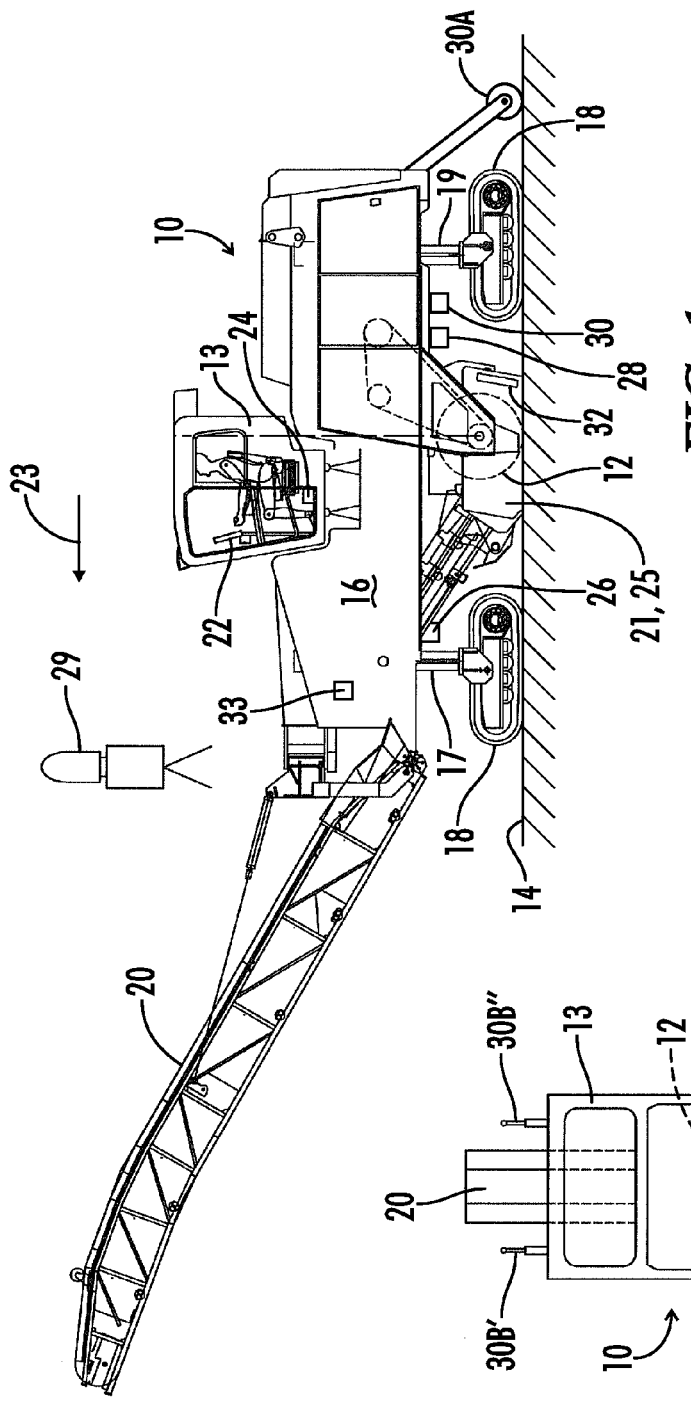
FIG. 1 is a side elevation view of a construction machine.

The machine 10 shown in FIG. 1 is a construction machine, namely a road milling machine, and is depicted to represent all types of machines with a milling drum 12 that work a ground surface or traffic surface 14. The machine 10 may also be a mining machine which is used to mine deposits, for example, in opencast mining which is also called a surface miner. The machine 10 may also be a recycler machine or a soil stabilizer machine.

The machine 10 shown in FIG. 1 comprises a machine frame 16 in which the milling drum 12 is supported in a rigid or height-adjustable manner. The machine 10 is carried by a chassis which, in FIG. 1, is formed by crawler tracks 18. It is understood that wheels may be used instead of tracks. The tracks are connected with the machine frame 16 by lifting columns 17 and 19. The milled material can be loaded onto a transport vehicle by means of a transport conveyor 20.

Using the lifting columns 17, 19, the machine frame 16 can be lifted or lowered or moved to take a predetermined inclined position with respect to the ground or traffic surface 14. The milling drum or milling roll 12 supported in the machine frame 16 is enclosed by a roll case or housing 21 which is open at the front, seen in the travelling direction 23, towards the conveyor 20 that conveys the milled material in a front part of the machine frame. The roll housing 21 includes side plates 25 and 27 arranged on either side near the front of the milling drum 12. Behind the milling drum 12, a height-adjustable stripping plate 32 is arranged. In operation, the stripping plate 32 engages a milling track 34 formed by the milling drum 12 and strips the bottom of the milling track 34 so that no milled material is left in the milling track 34 behind the stripping plate 32.

On its top side, the machine frame 16 carries an operator's platform 13 which may include a cabin. An operator sits or stands in the operator's platform 13 and controls the functions of the machine 10 by means of a machine control system 22. Said machine functions are, for example, advance speed, steering, milling depth of the milling drum 12 etc. A computer system 24 is provided for data processing. The computer system 24 may also be integrated in the machine control system 22.

In order to automatically determine a volume of material milled by the machine 10, a plurality of sensors are located on the machine. These sensors are only schematically shown in FIG. 1, and are described in more detail below. A first sensor 26, which may also be referred to as a profile sensor 26, is configured to detect at least one profile parameter of the ground surface 14 directly in front of the milling drum 12. A profile parameter may be any signal or measurement corresponding to the location of the ground surface directly in front of the milling drum 12. A second sensor 28, which may also be referred to as a depth sensor 28, is configured to detect at least one depth parameter corresponding to a milling depth of the milling drum 12. A depth parameter may be any signal or measurement corresponding to the milling depth of the milling drum 12. A third sensor 30, which may also be referred to as a distance sensor 30, is configured to detect at least one distance parameter corresponding to a distance traveled by the machine 10. A distance parameter may be any signal or measurement corresponding to the distance traveled by the machine 10.

Figure 2:
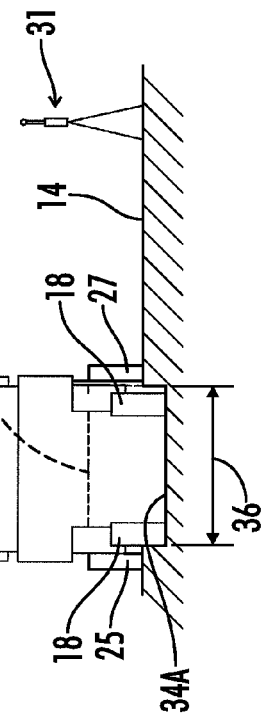
FIG. 2 is a rear elevation view of the construction machine of FIG. 1 when cutting a first milling track.

FIG. 2 is a schematic rear elevation view of the machine 10 in operation. In FIG. 2 the machine 10 is cutting a first milling track 34A into the ground surface 14. The milling drum 12 has a drum width 36, and thus the width of the first milling track 34A is equal to the drum width 36.

Figure 3:
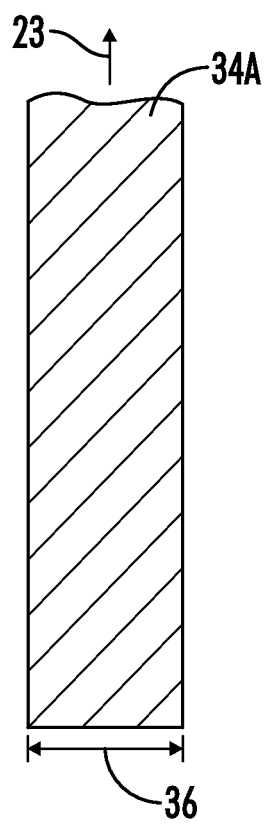
FIG. 3 is a schematic plan view representing the appearance of the first milling track.
Figure 4:
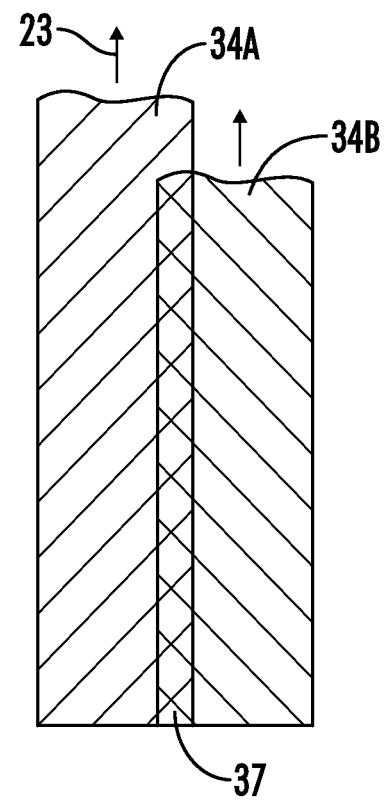
FIG. 4 is a schematic plan view similar to FIG. 3 representing the appearance of the first milling track and a second milling track partially overlapping the first milling track.

FIG. 3 is a schematic plan view representing the appearance of the first milling track 34A. In FIG. 4, a second milling track 34B is schematically shown, and the second milling track 34B overlaps the first milling track 34A in an overlap area 37.

Figure 5:
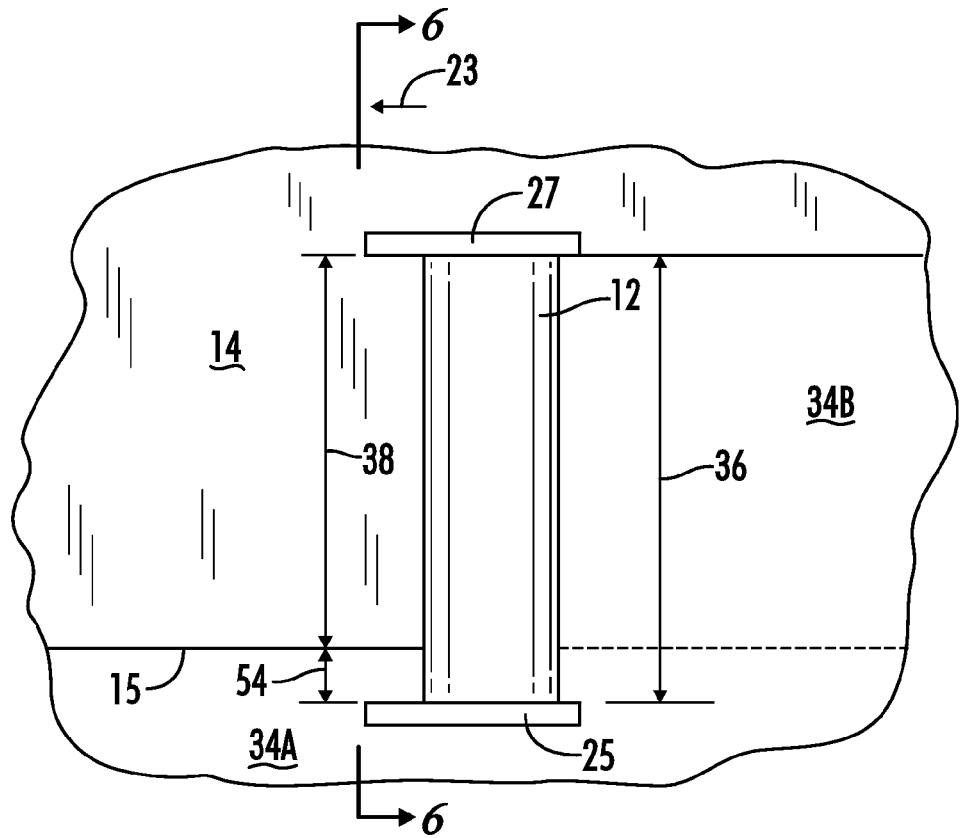
FIG. 5 is a schematic plan view showing the milling roller and side plates while milling the second milling track of FIG. 4.
Figure 6:
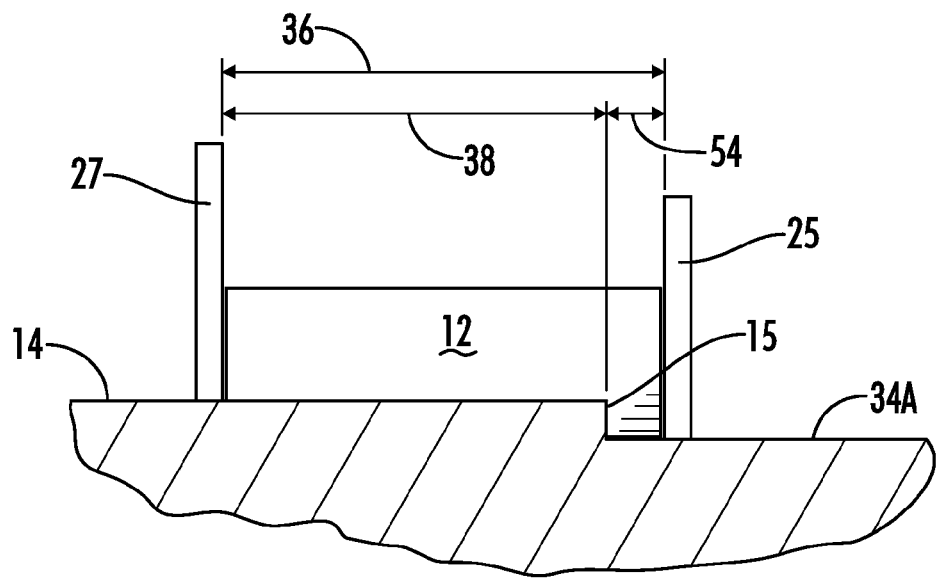
FIG. 6 is a schematic front elevation view taken along line 6-6 of FIG. 5.

FIG. 5 is a schematic plan view showing the milling drum 12 and the side plates 25 and 27 as the milling drum is in the process of cutting the second milling track 34B. FIG. 6 is a schematic elevation cross-section view taken along line 6-6 of FIG. 5, showing the profile of the ground surface in front of the milling drum 12. When cutting the second milling track 34B the milling drum 12 is not cutting across its entire width, but instead is only cutting a reduced milling width 38.

Assuming that the milling drum 12 is cutting the second milling track 34B down to the same elevation as the first milling track 34A, then in order to determine the volume of material being milled the information needed includes the reduced milling width 38, the milling depth, and the distance of the cut along the direction of travel 23. If usage is to be determined from the surface area milled, the surface area can be determined from the reduced milling width 38 and the distance of cut along the direction of travel 23. For a given interval of time this volume or area can be calculated from that information. The calculation can be repeated for a series of successive times, and the sub-volumes or sub-areas for the successive times can be added together to get a total milled volume or a total milled area. The profile of the ground surface 14 in front of milling drum 12 as seen in FIG. 6 is only one example of the general types of profiles that might be encountered. Some of the various ground profile types that might be seen directly in front of the milling drum 12 are represented schematically in FIGS. 7-14. In each case a cross-sectional area 42 to be milled is shaded.

Figure 7:
FIG. 7 is a schematic front elevation cross-section view of the volume to be milled in front of the milling drum in one scenario.
Figure 8:
FIG. 8 is a schematic front elevation cross-section view of the volume to be milled in front of the milling drum in another scenario.
Figure 9:
FIG. 9 is a schematic front elevation cross-section view of the volume to be milled in front of the milling drum in another scenario.
Figure 10:
FIG. 10 is a schematic front elevation cross-section view of the volume to be milled in front of the milling drum in another scenario.
Figure 11:
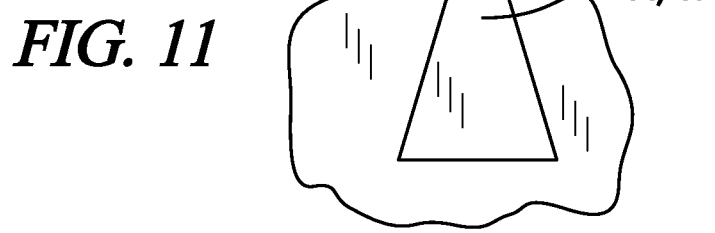
FIG. 11 is a schematic plan view of the ground surface being milled in FIG. 10.

FIG. 7 represents a uniform height ground surface 14 as seen during the cutting of the initial milling strip 34A. FIG. 8 represents a situation like the cutting of second milling strip 34B which has a small overlap with a previously milled strip. FIG. 9 represents a situation that might be encountered on the last pass of a milling project where there is a relatively narrow remaining strip to be milled. FIG. 10 represents a situation where there is an island 40 of unmilled material which has a previously milled edge on either side. FIG. 11 shows the island 40 in plan view, where it is seen that the width of the island 40 may vary during the cut.

Figure 12:
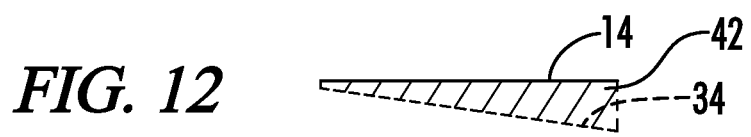
FIG. 12 is a schematic front elevation cross-section view of the volume to be milled in front of the milling drum in another scenario.
Figure 13:
FIG. 13 is a schematic front elevation cross-section view of the volume to be milled in front of the milling drum in another scenario.
Figure 14:
FIG. 14 is a schematic front elevation cross-section view of the volume to be milled in front of the milling drum in another scenario.

In all of the examples shown in FIGS. 7-10 it is assumed that the milling drum is oriented parallel to the ground surface 14 so that the depth of cut is uniform across the drum width. But there are other situations which also require consideration. For example, FIG. 12 represents a situation where a milling track 34 is being cut with a cross-slope relative to the ground surface 14. FIG. 13 represents a situation where the ground surface 14 is not of uniform elevation. FIG. 14 represents a situation similar to FIG. 8, except where the second milling track 34B is being cut to a greater depth than was the first milling track 34A.

For all of the situations represented in FIGS. 7-14 the volume milled or area milled may be determined by observing the profile of the ground surface 14 directly in front of the milling drum, measuring the milling depth of the milling drum if volume milled is being determined, and measuring the distance the milling drum advances in the direction of travel. A sub-volume or sub-area milled during distance traveled or during a given interval of time can be calculated from this information. The sub-volume or sub-area can be referred to as a sub-quantity of usage. The calculation can be repeated for a series of successive times, and the sub-volumes or sub-areas for the successive times can be added together to get a total milled volume or total milled area over any desired period of time.

The present system provides a method for determining a usage of the machine 10, which method includes the steps of:

(a) detecting with the profile sensor 26 at least one profile parameter of the ground surface 14 in front of the milling drum 12;

(b) detecting with the distance sensor 30 at least one distance parameter corresponding to a distance traveled in the direction 23 by the construction machine 10; and (c) determining the usage of the construction machine at least partially as a function of the profile parameter and the distance parameter.

If the usage is based on volume milled it is also necessary to use a depth sensor 28 to detect at least one depth parameter corresponding to a milling depth of the milling drum. Usage based on volume milled can be determined as a function of the profile parameter, the depth parameter and the distance parameter. Usage based on area milled can be determined as a function of the profile parameter and the distance parameter.

The method may further provide that:

the detection of the profile parameter and the depth parameter are performed repeatedly at successive times; and the usage is determined by determining a series of sub-quantities of usage, each sub-quantity being associated with at least one of the successive times, and summing of the sub-quantities. The successive times may be separated by a selected time interval, or may be separated by a selected fixed distance between times.

The profile parameter may include a location along the drum width 36 of at least one previously cut edge 15 of a previously milled area 34A in front of the milling drum 12. In that case the actual width 38 of the material being milled is less than the drum width 36 due to the presence of the previously milled area 34A in front of the milling drum 12.

In general the profile parameter may include detection of any of the profile types shown in FIGS. 7-14.

A number of different sensor types are available for each of the first, second and third sensors 26, 28 and 30, as is further explained below.

Determination of Profile Parameters

Laser Profile Scanners—Triangulation Methods

One technology which can be used for the first sensor 26 for determining the profile of the ground surface 14 in front of the milling drum 12 is a laser profile scanner. Such scanners can measure distance to objects in at least two different ways. One is the use of triangulation methods. The other is to directly measure distances using time of flight of reflected signals.

Figure 15:
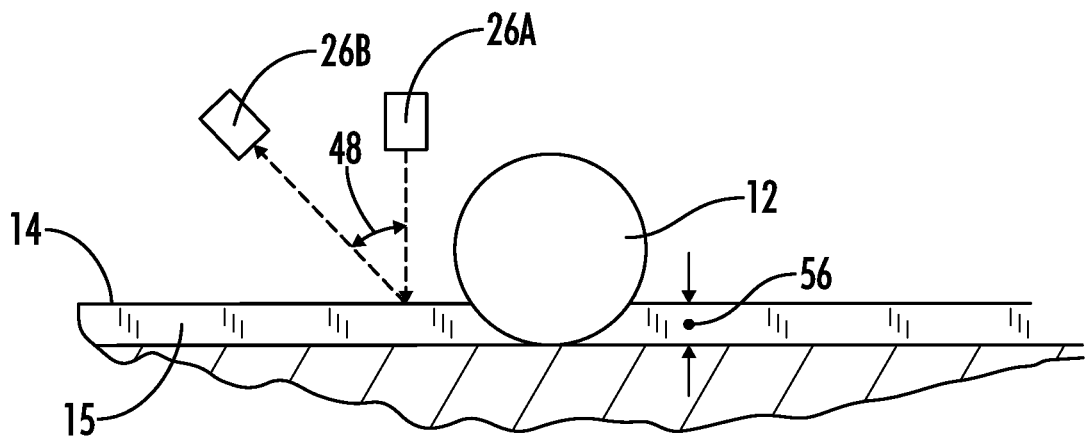
FIG. 15 is a schematic side elevation view of a triangulation type of laser profile scanner system.
Figure 16:
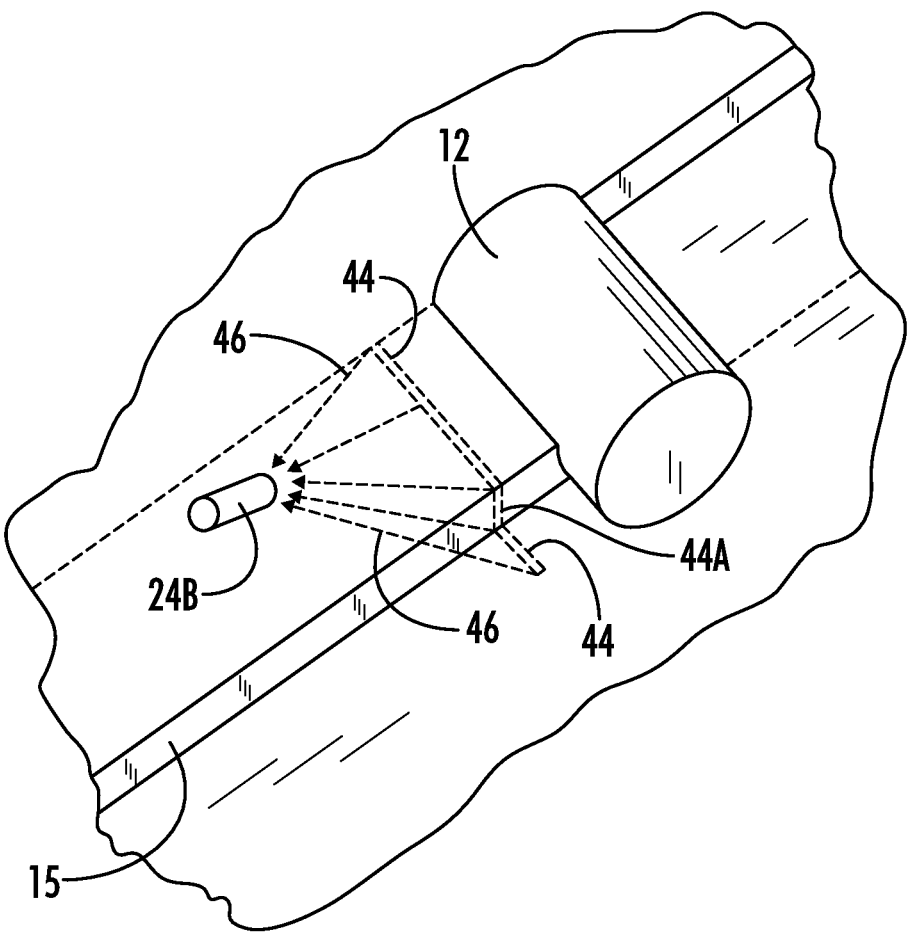
FIG. 16 is a schematic perspective view of the scanner system of FIG. 15.

The triangulation method is schematically illustrated in FIGS. 15 and 16. FIG. 15 is a side elevation view and it shows the first sensor 26 as having a laser source 26A and a receiver 26B. It will be understood that the source 26A and receiver 26B can also be incorporated into one integral laser profile scanner unit. The laser source 26A projects a line of laser light downward onto the ground surface 14 directly in front of the advancing milling drum 12. This narrow line of laser light is designated as 44 in FIG. 16, which is a perspective view of the system of FIG. 15. In FIG. 16 the laser source is not shown. Reflected light 46 from along line 44 is received by receiver 26B.

Due to the previously cut edge 15, a displacement or step 44A is readily apparent in the laser light line 44. Because the exact positions of the laser source 26A and the receiver 26B and the angle 48 between them are known, the position of the step 44A representing the location of edge 15 can be determined by triangulation. The laser scanner measures the distance between the machine and the surface of the street. The signals are transformed into a Cartesian coordinate system projected onto the street. The detection of the step 44A is achieved by mathematical gradient methods.

One suitable laser profile scanner for use as described above is the LPS 36 Laser Measurement System available from Leuze electronic GmbH & Co. KG of Owen, Germany.

Laser Profile Scanners—Time of Flight Methods

Figure 17:
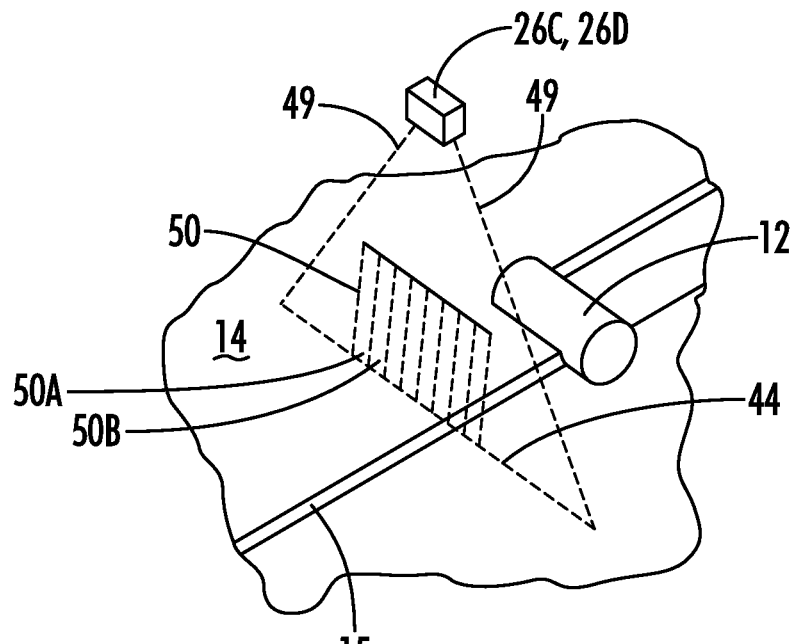
FIG. 17 is a schematic perspective view similar to FIG. 16, showing a time of flight type of laser or LED scanner system.

Another technology which may be used for first sensor 26 is a laser profile scanner 26C that measures distance via time of flight of the reflected light. FIG. 17 schematically illustrates such a system. FIG. 17 is a schematic perspective view similar to FIG. 16. The laser profile scanner 26C directs a fan of laser light downward in a fan shape as indicated at 49 to illuminate a line 44 on the ground in front of the milling drum 12. A sensor contained in the laser profile scanner 26C measures time of flight of reflected light to determine the distance to the various points on the ground along line 44. The scanner 26C has an operating range 50 indicated in dashed lines. The operating range 50 is divided into columns 50A, 50B, etc. and an internal processor within scanner 26C evaluates the reflected light and detects the height of the surface within each of its defined columns. Such a scanner can measure the height within each of its columns, and also via the abrupt change in height can identify the location of edge 15 along the width of the milling drum 12.

One commercially available scanner that can be used as scanner 26C is the LMS100 Laser Measurement System available from Sick, AG of Waldkirch, Germany.

LED Profile Scanners—Time of Flight Methods

Another technology which may be used for first sensor 26 is an LED scanner 26D. The LED scanner 26D is oriented and operates in a manner similar to the time of flight type of laser profile scanner 26C shown in FIG. 17. The LED scanner, however, uses LED light sources instead of laser light sources.

CCD Camera Sensor

Another method for detecting the profile of the ground surface uses a CCD camera as the profile sensor. The profile may be detected using an algorithm parsing the image recorded by the CCD camera. Thus the CCD camera can detect the location of the previously cut edge. Additionally the height of the detected previously cut edge can be calculated from the data gathered with the CCD camera. Two different scenarios for the use of a CCD camera as a detector are shown in FIGS. 26 and 27.

Figure 26:
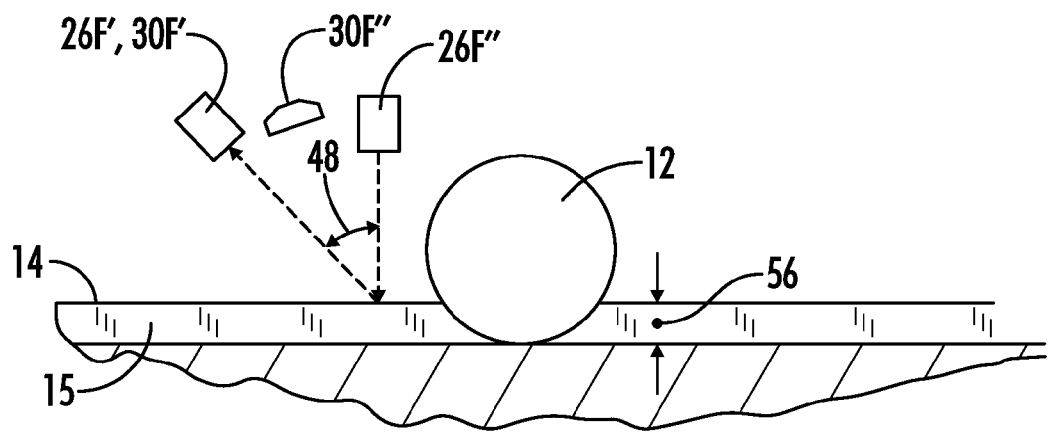
FIG. 26 is a schematic illustration of a two-dimensional CCD camera based profile and distance sensor system.

In FIG. 26 a two-dimensional CCD camera 26F' views a two-dimensional area illuminated by one or more laser light sources 26F". The same CCD camera 26F' could be used to measure the travelling speed of the machine 10 through image data processing. For data image processing an alternate diffuse light source 30F" may be provided. Thus a single CCD camera 26F' may function as both the profile sensor 26F' and the distance sensor 30F'. In general, the embodiment of FIG. 26 illustrates the principle that depending upon the technology used, one piece of equipment may provide the function of more than one of the first, second and third sensors 26, 28 and 30.

Figure 27:
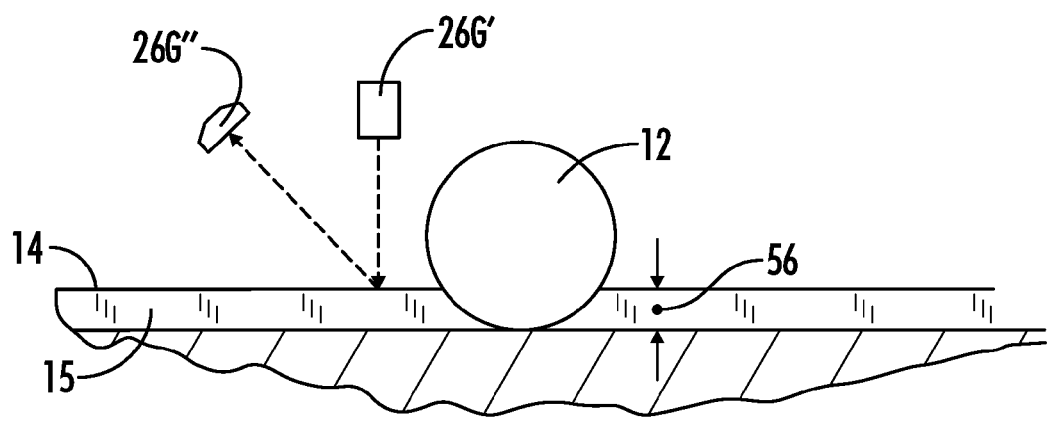
FIG. 27 is a schematic illustration of a line-scan CCD camera based profile and sensor system.

In FIG. 27 a line scan CCD camera 26G' views a line across the width of the ground surface being cut, and the area viewed may be illuminated with a light source 26G", which may be a diffuse light source.

Horizontal Distance Measurement

Figure 18:
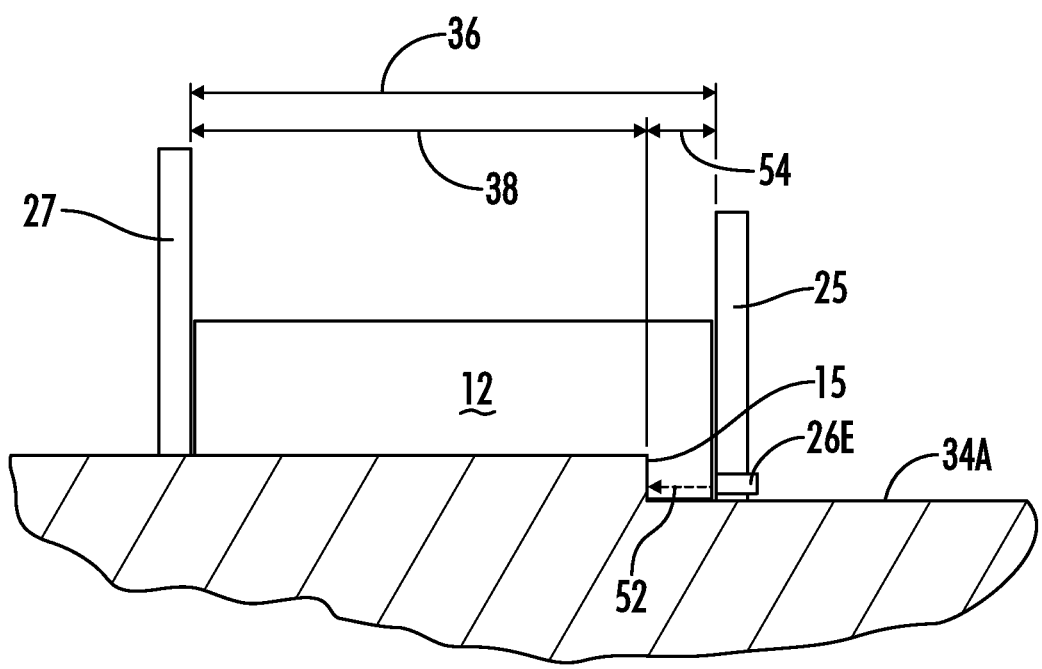
FIG. 18 is a schematic front elevation view of a distance sensor mounted in one of the side plates.

The profile parameter measured by the first sensor 26 can also be a more direct measurement of the width 38 to be milled in front of the milling drum. Such a system is illustrated in FIG. 18, which is a view similar to FIG. 6 showing a sensor 26E located in the side plate 25. The sensor 26E emits a signal and receives a reflected signal along a path 52 to measure a distance 54 from the edge of the milling drum 12 to the previously cut edge 15.

The sensor 26E can operate based upon several different technologies. Sensor 26E can be a laser based sensor. Sensor 26E can be an LED based sensor. Sensor 26E can be based on ultrasonic sensing.

The sensor 26E used to detect the previously cut edge 15 may be described as a touch free distance sensor supported from a side plate of the milling machine, the side plate being located on the previously milled area 34A, the touch free distance sensor being directed transverse to the direction of travel 23 of the construction machine. A second identical sensor may be supported from the opposite side plate.

It is noted that all of the profile sensors described above may be described as involving machine observation of the profile parameter. Machine observation means through the use of sensors and not via human measurement or human observation of the surface profile.

Determination of Depth Parameters

Various techniques are known for determining the milling depth 56 (see FIG. 15) of the milling drum 12, as described in U.S. Pat. No. 8,246,270 to Berning et al., and assigned to the assignee of the present invention, the details of which are incorporated herein by reference. FIGS. 19-24 illustrate the various depth sensing techniques.

Figure 19:
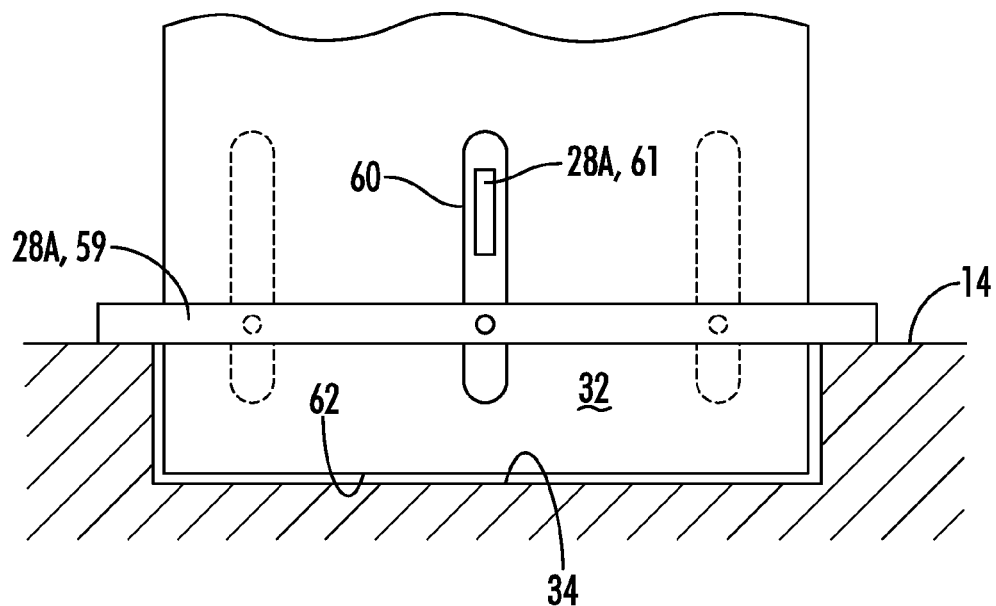
FIG. 19 is a schematic rear elevation view of one embodiment of a depth sensor using a horizontal ground engaging structural beam associated with the stripping plate.

The embodiment illustrated in FIG. 19 shows a structural beam 59 as a component of a depth measurement sensor 28A. The structural beam 59 rests on the ground surface 14 and is guided at the stripping plate 32 in a slot 60 extending linearly and orthogonally to a bottom edge 62 of the stripping plate 32. It is understood that two mutually parallel slots 60 can be provided in the stripping plate 32 or that the beam 59, serving as the sensing means, can be guided in a different manner so as to be height-adjustable. A position sensor 61 of depth sensor 28A detects the displacement of the beam 59 with respect to the stripping plate 32. Should two horizontally spaced slots 60 be used, it is possible to separately detect the milling depth on the left side of the milling track 34 and on the right side of the milling track 34. Moreover, this offers the possibility to determine an inclination of the machine frame 16 with respect to the ground surface 14.

Figure 20:
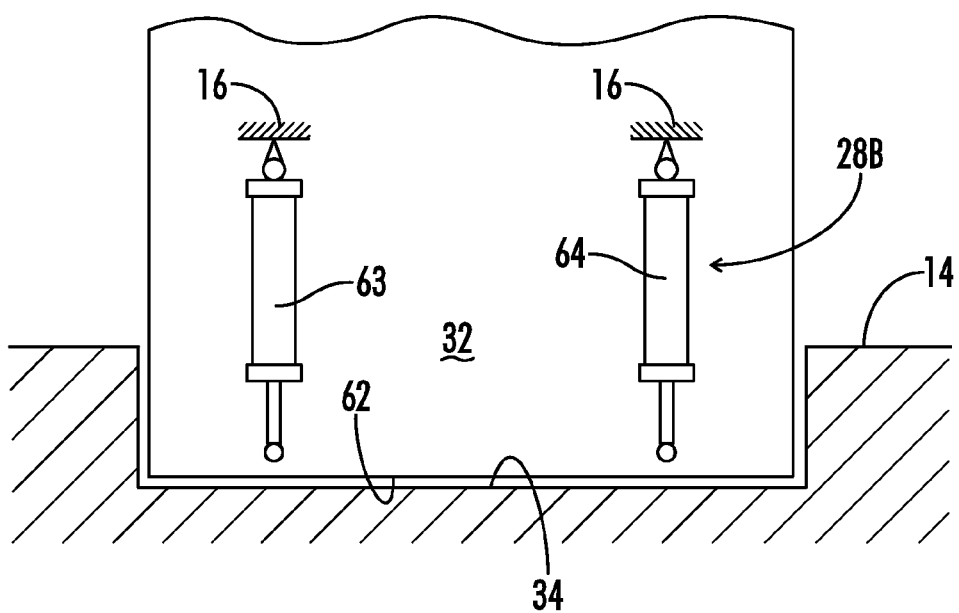
FIG. 20 is a schematic rear elevation view of an embodiment of a depth sensor using integral sensors built into piston/cylinder units connecting the stripping plate to the machine frame.

FIG. 20 illustrates another embodiment of a depth sensor 28B wherein the stripping plate 32 can be lifted or lowered by means of hydraulic means. The hydraulic means are formed by piston/cylinder units 63, 64 with an integrated position sensing system. This means that the piston/cylinder units 63, 64 not only allow for the stroke movement of the stripping plate, but moreover generate a position signal. This position signal generator within the piston/cylinder units 63, 64 provides the depth sensor 28B.

As is evident from FIG. 20, the piston/cylinder units 63, 64 have one end connected to the machine frame 16 and the other end connected to the stripping plate 32.

Figure 21:
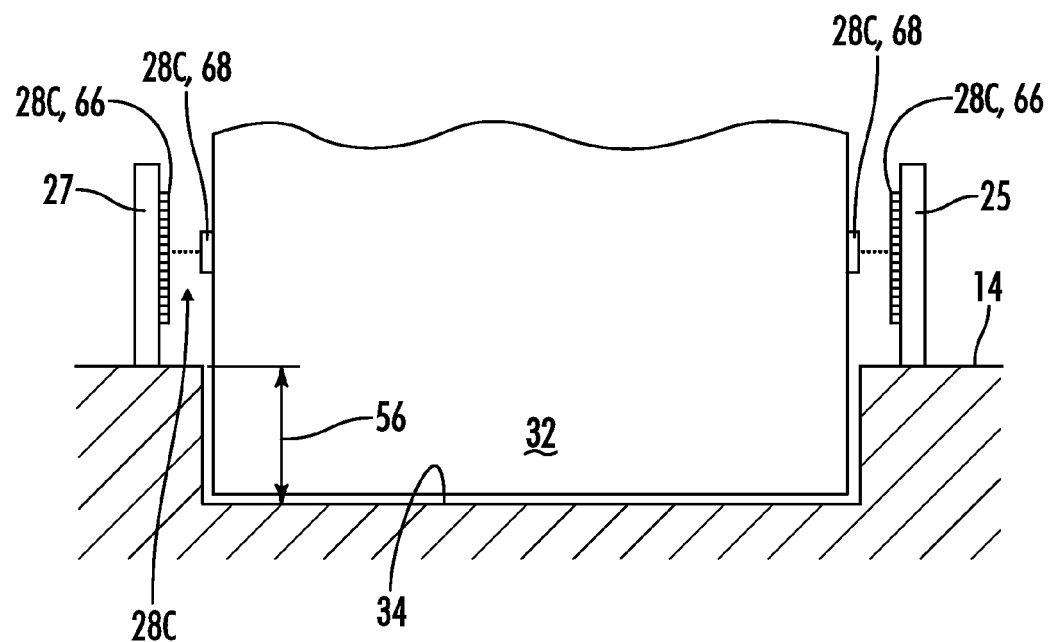
FIG. 21 is a schematic rear elevation view of an embodiment of a depth sensor using sensors detecting the position of the stripping plate relative to the side plates.

FIG. 21 illustrates an embodiment of depth sensor 28C, wherein the relative movement between the side plates 25 and/or 27 and the stripping plate 32 is measured directly in order to detect the milling depth of the milling track 34. To achieve this, elements 66 and 68 of the depth sensor 28C are provided, e.g., at the side plates 25 or 27 and opposite thereto at the stripping plate 32, which elements allow for the detection of the relative displacement of the stripping plate 32 with respect to the side plates 25 or 27. This displacement corresponds to the milling depth 56 in FIG. 21. For example, such a sensor 28C, which measures relative displacements, may be formed by an optical system, e.g. by reading a scale with an optical sensor, or by an electromagnetic or inductive system.

Figure 22:
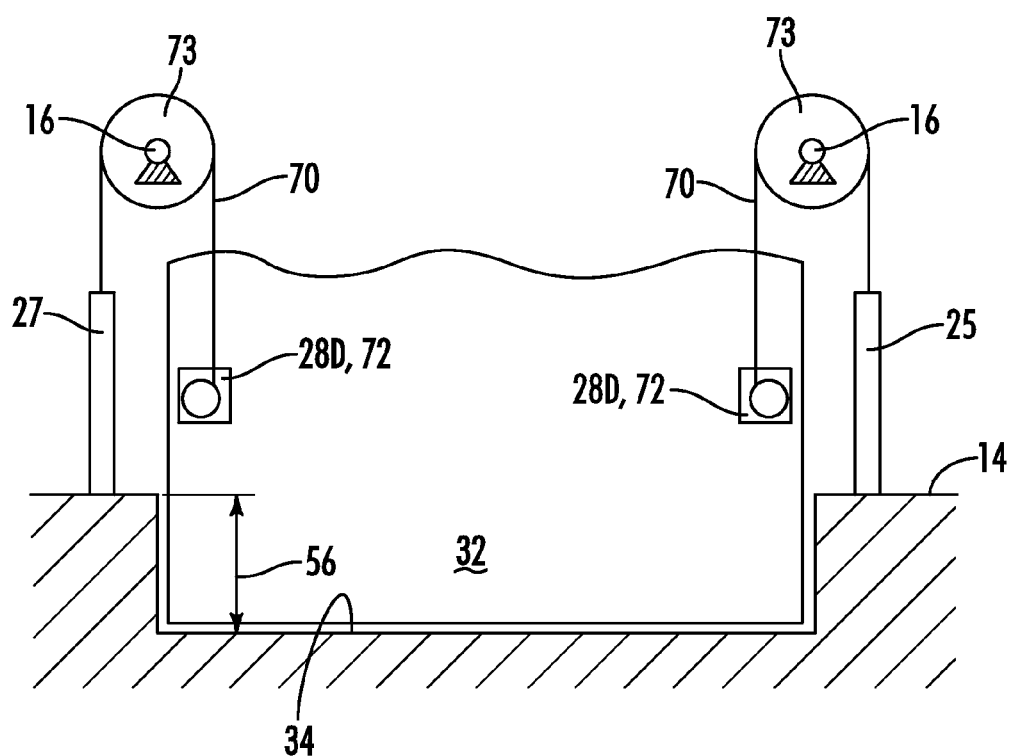
FIG. 22 is a schematic rear elevation view of an embodiment of a depth sensor using cable sensors detecting the position of the stripping plate relative to the side plates.

As an alternative and as illustrated in FIG. 22, a relative position sensing sensor 28D between the side plates 25 or 27 and the stripping plate 32 may also be formed by a cable line 70 in combination with a cable-line sensor 72. The cable line 70 is coupled with the stripping plate 32 on the one hand and, on the other hand, with at least one of the side plates 25 or 27 via a guide roller 73, so that the signal from the cable-line sensor 28D can immediately indicate the value of the current milling depth.

As shown in FIGS. 23 and 24a-c, the side plates 25 and/or 27 themselves can be used as a component of a depth sensor 28E by monitoring their position with respect to the machine frame 16 by means of a cable line 78 and a cable-line sensor 80 or by means of piston/cylinder units 74, 76 with integrated position sensing means.

For example, the measuring means can also measure the displacement of the side plates 25 and 27 with respect to the machine frame 16. Should two measuring means be used, one in front of the side plates and one behind the same, seen in the travelling direction, it is also possible to determine the longitudinal inclination of the machine frame 16 with respect to the ground surface 14 or to also determine the transverse inclination of the machine frame 16 by a comparison of the measured values for both side plates on both sides of the milling roll 12.

Figure 23:
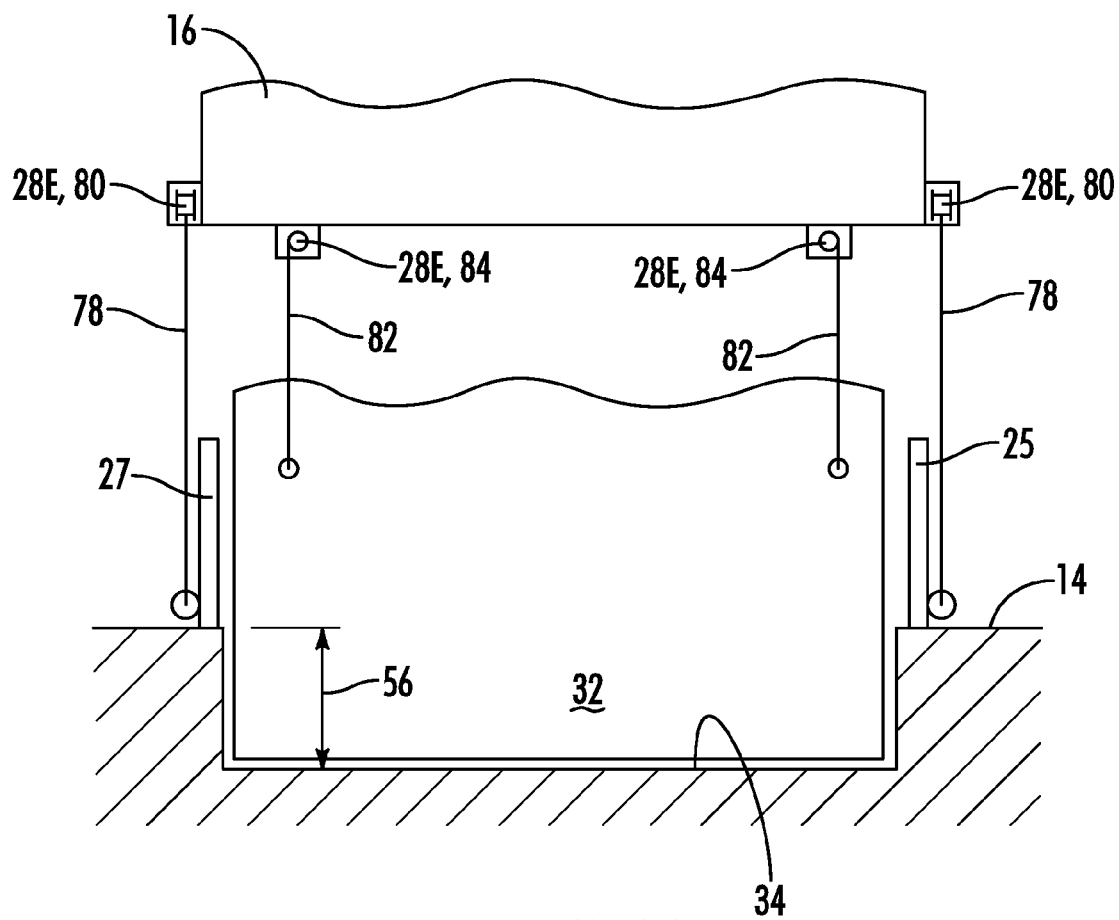
FIG. 23 is a schematic rear elevation view of an embodiment of a depth sensor using cable sensors on both the stripping plate and the side plates.

FIG. 23 illustrates one embodiment, wherein cable lines 82 comprising cable-line sensors 84 mounted to the machine frame 16 are arranged on both sides of the stripping plate 32. On either side of the machine, the side plates 25 and 27 are also provided with cable lines 78 and cable-line sensors 80 fastened at the machine frame 16. The milling depth 56 is determined from the difference between the measured values of the cable-line sensors 80 for the side plates 25 and 27 and the cable-line sensors 84 of the stripping plate 32. Here, the measurement should preferably be made in the same substantially vertical plane in order to avoid measurement errors.

Figure 24A:
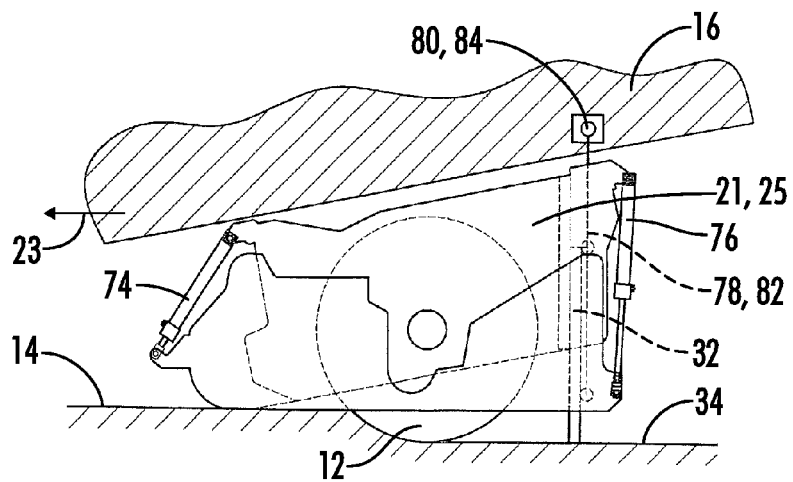
FIGS. 24a-24c are a series of schematic side elevation views showing sensors that can determine slope of the machine frame to correct milling depth measurements when the frame is not parallel to the ground surface.
Figure 24B:
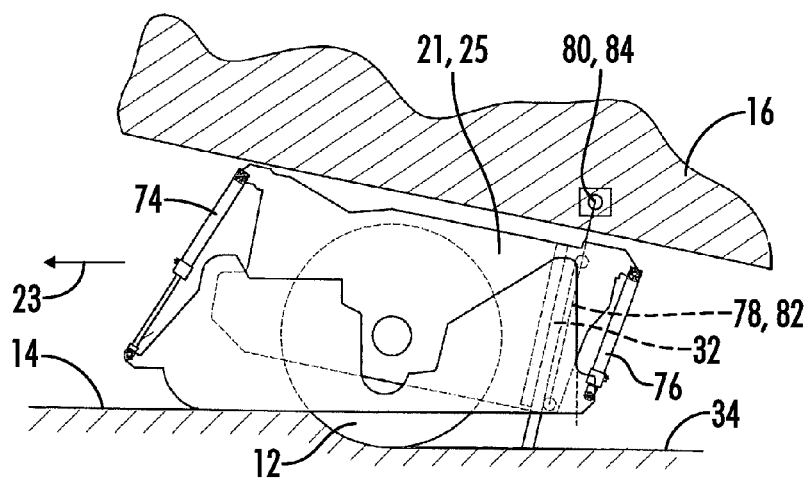
Figure 24C:
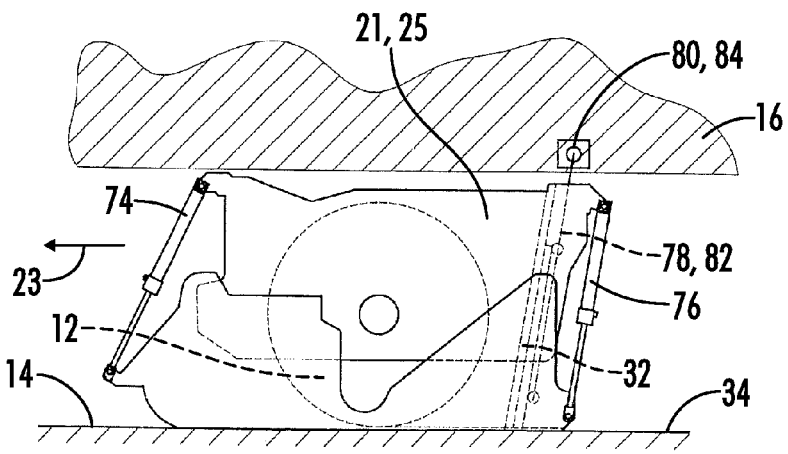

FIGS. 24a to 24c illustrate the cable-line sensors 80, 84 for the side plates and the stripping plate, the drawings only indicating one cable-line sensor 80, 84, since the cable-line sensors are arranged one behind the other in substantially the same plane.

FIGS. 24a, 24b, 24c illustrate the case where the ground surface 14 is not parallel to the machine frame 16, the measured milling depth value indicated by the measuring means having to be corrected because of an angle error, because a longitudinal inclination of the machine frame 16 corrupts the measurement signal at the level of the stripping plate 32. Due to the fixed geometrical relations, i.e. the distance of the stripping plate 32 from the rotational axis of the milling roll 12, the measured milling depth value can be corrected, knowing the angular deviation from the horizontal in the travelling direction, and the current milling depth at the level of the milling roll axis can be calculated. The angular deviation in the travelling direction may be determined, for example, from the position of the lifting columns 17, 19 of the caterpillar track assemblies 18 or the piston/cylinder units 74, 76.

It is further evident from FIGS. 24a to c, to which extent the side plates 25 and 27 are pivotable with respect to the machine frame 16. Since the piston/cylinder units 74, 76 are also provided with position sensing systems, these measuring signals may be used as an alternative to cable-line sensors 80 to determine the distance of the side plates 25 or 27 from the machine frame 16.

FIG. 24c illustrates the position of the at least one side plate 25 for a ground-parallel position of the machine frame 16. The stripping plate 32 illustrated in FIGS. 24a to 24c is located at the roll case 21, so that the distance of the stripping plate 32 from the rotational axis to the milling roll 12 can be determined unambiguously in order to allow for a calculation of the milling depth correction should the machine frame 16 not be parallel to the ground.

The computer system 24 can calculate the current milling depth at the level of the milling roll axis from the position sensing signals received, and it can also generate a control signal for a vertical adjustment of the milling roll 12.

Preferably, the computer system 24 can automatically control the lifted condition of the at least one rear lifting column 19, seen in the travelling direction, to establish parallelism between the machine frame 16 and the ground surface 14 or to the horizontal plane or to a predetermined desired milling plane.

Also, the profile sensor 26 may be used in connection with other sensors to determine the milling depth. For example, the profile sensor 26 in front of the milling drum may measure the distance between the sensor 26 and the ground surface. The position of the sensor 26 is fixed relative to the machine frame 16. If the position of the stripping plate 32 relative to the machine frame 16 and thus relative to sensor 26 is measured, such as be a wire cable sensor, and the pitch of the machine frame 16 in relation to the ground surface is known, then the milling depth can be calculated. With reference to FIG. 1, this embodiment may be described as having the at least one depth parameter including an uncut ground surface depth parameter detected with the at least one profile sensor 26, and a milled surface depth parameter detected with the at least one depth sensor 28.

Similarly, another laser scanner may be used as the depth sensor to measure the distance from the second laser scanner and the machine frame from the milled surface behind the milling drum. If the machine frame is parallel to the ground surface, then the milling depth can be determined by subtracting the distance measured by the front laser scanner from the distance measured by the rear laser scanner. If the frame is not parallel, the inclination of the frame can be used to determine the milling depth from the measurements of the front and rear laser scanners.

Determination of Distance Parameters

Touchless Sensors for Determining Distance Traveled

One technology which can be used for third sensor 30 is similar to that used in a computer mouse and detects objects within its field of view on the ground surface and measures change in position of those objects in the visual field to derive the distance traveled.

One commercially available touchless sensor that can be used as second sensor 28 is the Luxact sensor available from SMG Engineering e.K. of Munich, Germany.

Ground Engaging Distance Sensor

Another technology which can be used to measure the distance traveled is a "fifth wheel" type ground engaging sensor such as 30A schematically indicated in FIG. 1. This sensor may be described as a ground engaging free-wheeling distance sensor.

One commercially available sensor that can be used as the sensor 30A is the Model HFW80 Fifth Wheel Sensor available from GMH Engineering, of Orem, Utah, USA.

Figure 28:
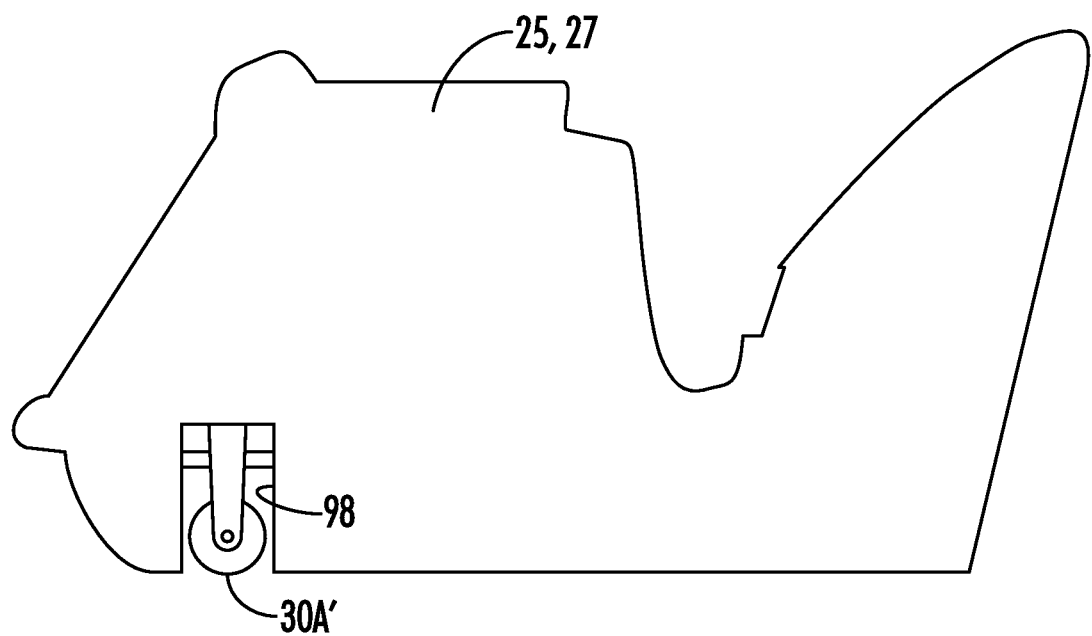
FIG. 28 is a schematic illustration of a side plate with a fifth wheel type distance sensor mounted in the side plate.

An alternative embodiment of a "fifth wheel" sensor installation is schematically illustrated in FIG. 28. There a schematic side elevation drawing is shown of one of the side plates 25, 27. A cutout 98 in the side plate allows a fifth wheel sensor 30A' to be mounted in the side plate. The sensor 30A' may be held against the ground by gravitational force.

GNSS Based Distance Measurement

Also the distance traveled by the machine 10 can be measured using a Global Navigation Satellite System (GNSS) measurement system, or by using a locally based reference system such as a total station.

As seen in FIG. 2, above the operator's platform 13, for example, on the roof of the operator's cabin, a GNSS receiver 30B' and/or 30B" may be arranged, said GNSS receiver being preferably arranged in such a manner that it is in a common vertical plane with the milling drum axis of the milling drum 12 when the machine 10 is aligned horizontally.

The GNSS receiver 30B' and/or 30B" forms a reference point on the machine 10 whereby the current machine position can be determined.

Other reference points on the machine 10 may also be selected in which case the positioning data for computing the machine position must then be corrected accordingly. The machine position relevant for computing is the centre of the milling drum 12 in relation to its longitudinal extension. If only a single GNSS receiver is used it is therefore preferably located vertically above said central position of the milling drum 12 when the machine 10 is standing on a horizontal plane or the machine frame 16 is aligned horizontally. Even if the GNSS receiver is attached in precisely this position, the positioning data require correction. A correction could only be omitted if the machine worked on a horizontal plane all the time and, in doing so, remained in parallel alignment to the same in both longitudinal and transverse direction. As soon as a transverse or longitudinal inclination of the machine 10 relative to the horizontal plane is present, a correction must be made, which is nearly always the case. Appropriate slope sensors are present to serve this purpose.

It is also possible to use two GNSS receivers 30B' and 30B" as shown in FIG. 2. When using two GNSS receivers 30B' and 30B", as depicted in FIG. 2, these are preferably located in the plane vertically above the milling drum axis and at an identical height. It is understood, however, that the two GNSS receivers 30B' and 30B" may also be arranged at other points of the machine 10.

The GNSS receivers 30B' and 30B" should ideally be arranged on the roof of the operator's platform 13 so that, on the one hand, the interference from reflected signals is as small as possible and, on the other hand, when driving through a milling area bounded by trees, at least one GNSS receiver does not lose contact to all satellites on account of the trees.

Additionally, reference positioning data from a stationary GNSS receiver 31 or a data reference service can be used to increase the accuracy of determining the machine position. As a further alternative for determining the machine position, a total station 29 may be used which is capable of tracking a reference point on the machine three-dimensionally, with it also being possible for several total stations 29 to be used. If a total station is used, then the GNSS receivers must be replaced by measuring prisms which may be referred to as total station receivers.

The current position of the machine 10 can be recorded by means of the GNSS or total station receivers, and thus the length of the distance travelled along the milling trajectories can be computed and stored by means of the computer processor 24.

Distance Measurement Based on Machine Data

Another technique for measuring distance travelled is to use machine data, for example the driving speed of the ground engaging tracks 18, to estimate the distance travelled by the machine 10.

The Data Processing System

Figure 25:
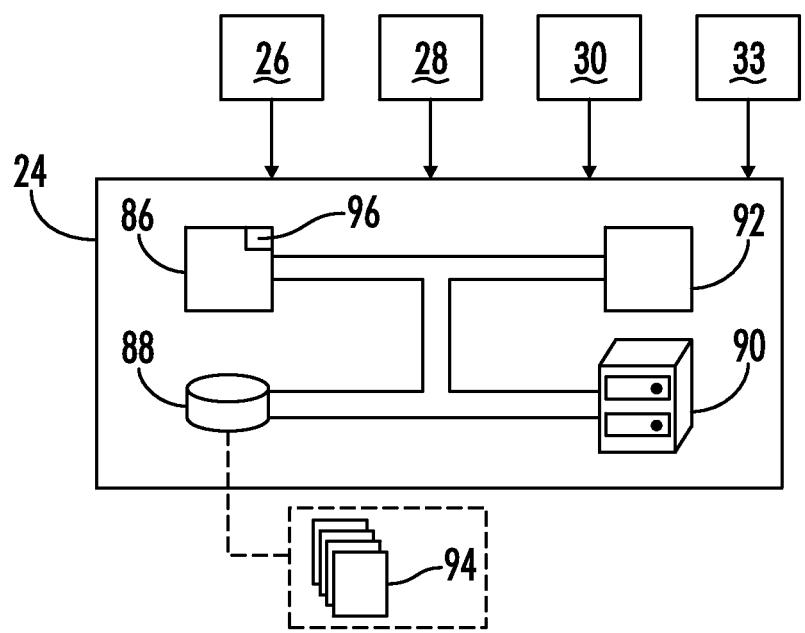
FIG. 25 is a schematic illustration of the data processing system for determining milled volumes based on the data from the sensors.

The on-board computer system 24 is provided for receiving information from the sensors 26, 28 and 30, and for determining and saving data corresponding to the volume of material milled or corresponding to the surface area milled, and for communicating that data. FIG. 25 schematically illustrates the computer system 24 and its connection with the various sensors. The sensor 30 is representative of any of the depth sensors described herein including a cross-slope sensor.

The computer system 24 further includes a processor 86, a computer-readable memory medium 88, a database 90 and an I/O platform or module 92 which may typically include a user interface generated by the program instructions in accordance with methods or steps described in greater detail below.

The term "computer-readable memory medium" as used herein may refer to any non-transitory medium 88 alone or as one of a plurality of non-transitory memory media 88 within which is embodied a computer program product 94 that includes processor-executable software, instructions or program modules which upon execution may provide data or otherwise cause a computer system to implement subject matter or otherwise operate in a specific manner as further defined herein. It may further be understood that more than one type of memory media may be used in combination to conduct processor-executable software, instructions or program modules from a first memory medium upon which the software, instructions or program modules initially reside to a processor for execution.

"Memory media" as generally used herein may further include without limitation transmission media and/or storage media. "Storage media" may refer in an equivalent manner to volatile and non-volatile, removable and non-removable media, including at least dynamic memory, application specific integrated circuits (ASIC), chip memory devices, optical or magnetic disk memory devices, flash memory devices, or any other medium which may be used to stored data in a processor-accessible manner, and may unless otherwise stated either reside on a single computing platform or be distributed across a plurality of such platforms. "Transmission media" may include any tangible media effective to permit processor-executable software, instructions or program modules residing on the media to be read and executed by a processor, including without limitation wire, cable, fiber-optic and wireless media such as is known in the art.

The term "processor" as used herein may refer to at least general-purpose or specific-purpose processing devices and/or logic as may be understood by one of skill in the art, including but not limited to single- or multithreading processors, central processors, parent processors, graphical processors, media processors, and the like.

The computer system 24 receives data from profile sensor 26 corresponding to at least one profile parameter of the ground surface 14 in front of the milling drum. The computer system 24 receives data from depth sensor 28 corresponding to at least one depth parameter corresponding to the milling depth 56 of the milling drum 12. The computer system 24 receives data from distance sensor 30 corresponding to a distance parameter corresponding to a distance traveled by the construction machine 10. Then based upon programming 94 the system 24 determines the volume of material milled at least partially as a function of the profile parameter, the depth parameter and the distance parameter. Or if usage is being measured based on the area milled, the system 24 determines the area milled at least partially as a function of the profile parameter and the distance parameter.

The following is an example of the determination of a series of sub-volumes milled. At any given time the profile parameter and the depth parameter can be measured, from which can be determined the cross-sectional area being milled at that time. To determine a sub-volume milled there must be a determination of a distance milled associated with the cross-sectional area determined for the given point in time. This distance may be a distance immediately preceding the given time, or a distance immediately following the given time, or a distance spanning the given time.

Also, the cross-sectional area for more than one time could be used. For example, if the cross-sectional area is determined at two successive times, and if the distance used is the distance traveled between those two times, then a sub-volume could be calculated based on the distance traveled times an average of the two successive cross-sectional areas. Other formulas could be used, all of which provide approximations of the sub-volume milled during a selected time interval or during a selected distance interval. It will be appreciated that the more frequently the calculations are performed, and the smaller the sub-volumes are, the more accurate the calculation of the total volume milled will be.

If the usage determination is to be based on the area milled rather than the volume milled, the same process described above is followed, except that rather than determining the cross-sectional area milled it is only necessary to determine the actual width being milled.

If the interval used for determination of the sub-volume or sub-areas is time based the time interval preferably is in the range of from 0.1 to 1 seconds. More generally, the time interval may be described as preferably being no greater than ten seconds. The time intervals may be determined via an internal clock 96 of the processor 86.

If the interval used for determination of the sub-volumes or sub-areas is distance based, the distance interval preferably is in the range of from 1 to 10 cm. More generally, the distance interval may be described as preferably being no greater than 100 cm.

In this manner a system is provided whereby the construction machine 10 can continuously monitor and record the volume or area of material milled. This allows automatic record keeping and reporting of milled volumes or milled areas. This data is useful for project management, such as in reporting milled volumes or milled areas for purposes of determining compensation due under the work contract. This same data also may provide a basis for scheduling of preventive maintenance on the milling equipment, because the milled volume or milled area is a highly correlated to wear and tear on the machinery.

Although the system described above has been discussed primarily in the context of determining the volume of material milled, it will be understood that by using just the profile parameter and the distance parameter, the same system can determine the surface area that has been milled. When determining the area milled, it is also necessary to determine whether the milling drum is actively milling the ground surface. One technique for doing this is to provide an acceleration sensor 33 attached to the machine frame 16. If the milling drum 12 is actively milling the ground surface, this can be determined from the vibrations detected by the acceleration sensor 33. Other techniques for determining active operation of the milling drum 12 include interpretation of working parameters of the machine 10, such as the power output of the combustion engine powering the milling drum 12.

Thus it is seen that the apparatus and methods of the present invention readily achieve the ends and advantages mentioned as well as those inherent therein. While certain preferred embodiments of the invention have been illustrated and described for purposes of the present disclosure, numerous changes in the arrangement and construction of parts and steps may be made by those skilled in the art, which changes are encompassed within the scope and spirit of the present invention as defined by the appended claims.

What is claimed is:

1. A construction machine, comprising:
a machine frame;
a plurality of ground engaging supports for supporting the machine frame;
a milling drum supported from the machine frame for milling a ground surface, the milling drum having a drum width;
at least one profile sensor configured to detect at least one profile parameter of a ground surface in front of the milling drum;
at least one distance sensor configured to detect at least one distance parameter corresponding to a distance traveled by the construction machine;
at least one depth sensor configured to detect at least one depth parameter corresponding to a milling depth of the milling drum; and
an on-board processor located on the construction machine and communicated with the sensors, the processor being configured to determine a usage of the construction machine as a volume of material milled by the construction machine at least partially as a function of the profile parameter, the depth parameter and the distance parameter.

2. The construction machine of claim 1, wherein:
the processor is configured to receive the at least one profile parameter and the at least one depth parameter repeatedly at successive times, and to determine a series of sub-volumes milled and to sum the sub-volumes.

3. The construction machine of claim 1, wherein the at least one profile sensor comprises a laser profile scanner.

4. The construction machine of claim 3, wherein the laser profile scanner is configured to detect the at least one profile parameter by triangulation.

5. The construction machine of claim 3, wherein the laser profile scanner is configured to detect the at least one profile parameter by time of flight measurement.

6. The construction machine of claim 1, wherein the at least one profile sensor comprises an LED object detecting sensor.

7. The construction machine of claim 1, wherein the at least one profile sensor comprises a touch free distance sensor supported from a side plate of the construction machine.

8. The construction machine of claim 1, wherein the at least one depth sensor comprises a cable sensor connected to a stripping plate of the construction machine.

9. The construction machine of claim 1, wherein the at least one depth sensor is configured to detect a position of a stripping plate relative to a side plate of the construction machine.

10. The construction machine of claim 1, wherein the at least one depth sensor includes a cross-slope sensor.

11. The construction machine of claim 1, wherein:
the at least one depth sensor includes the at least one profile sensor configured to detect an elevation of an uncut ground surface, in combination with another depth sensor configured to detect an elevation of a milled surface.

12. The construction machine of claim 1, wherein the at least one distance sensor comprises a touchless sensor configured to detect objects within its field of view on the ground surface and to measure changes in position of those objects in the field of view.

13. The construction machine of claim 1, wherein the at least one distance sensor comprises a ground engaging free-wheeling distance sensor.

14. The construction machine of claim 13, wherein:
the ground engaging free-wheeling distance sensor is mounted in a ground engaging side plate of the machine.

15. The construction machine of claim 1, wherein the at least one distance sensor comprises a Global Navigation Satellite System (GNSS) sensor.

16. The construction machine of claim 1, wherein the at least one distance sensor comprises a total station sensor.

17. The construction machine of claim 1, wherein:
the at least one profile sensor and the at least one distance sensor are both at least partially embodied in a single dual-purpose sensor component.

18. The construction machine of claim 17, wherein the single dual-purpose sensor component comprises a Charge-Coupled Device (CCD) camera.

19. The construction machine of claim 1, wherein:
the at least one profile sensor and the at least one distance sensor are separate components.

* * * * *